April 29, 1958     P. VAN ACKEREN     2,832,678
GAS-PRODUCERS

Filed May 21, 1954     2 Sheets-Sheet 2

INVENTOR
Paul van Ackeren
By Walter J. Moncelli
his ATTORNEY

United States Patent Office 2,832,678
Patented Apr. 29, 1958

2,832,678

GAS-PRODUCERS

Paul Van Ackeren, Essen, Germany, assignor, by mesne assignments, to Koppers Company, Inc., Pittsburgh, Pa., a corporation of Delaware Application May 21, 1954, Serial No. 431,518

3 Claims. (Cl. 48—76)

The present invention is concerned with gas producers of the kind in which the shaft is defined by a jacket made up of a plurality of vertical water cooled pipes which are connected at each of their upper and lower ends with an annular water chamber or header.

In the case of gas producers with a shaft defined by vertical water cooled pipes, the steam which is produced during the cooling is generally received in a steam collector which is so connected with the cooling pipes that the water passes through the pipes and the steam collector in circulatory fashion. It is already known, in the case of such gas producers, to conduct the hot produced gas from the producer externally around the cooling pipes with the object of utilising the sensible heat of the gas as fully as possible. In these instances therefore, only the upper half of the surface of the cooling pipes is flushed by the hot gas.

In pursuance of the present invention, the utilisation of the sensible heat of the hot produced gas is substantially increased in that this gas is conducted through a pipe passing through the cooling water, such that the gas is flushed on all sides by the cooling water.

Accordingly the invention resides in the fact that the water cooled pipes have passing through the length of their interiors pipes connected respectively with a gas collecting chamber in the gas producer and with a gas main. By this means the sensible heat of the produced gas is utilised more fully by reason of the fact that a special heat exchanger arranged outside the gas producer becomes unnecessary, and the sensible heat in the device which is required for the water cooling of the shaft jacket is transferred to the cooling water by producing a more highly charged steam than is possible in the usual shaft casing cooling device.

The gas can be conducted downwards through the water cooled pipes and withdrawn from an annular collecting chamber at the bottom. In a preferred embodiment of the invention, however, alternate gas-conveying pipes passing through the water cooled pipes are connected at their upper ends with a gas collecting chamber above the point at which the shaft is charged with coal whilst the other gas-conveying pipes are connected at their upper ends through an annular chamber with the gas main, adjacent pairs of these gas-conveying pipes being interconnected at their lower ends.

As a result the gas passes through the pipes traversing the water cooled pipes alternately from the top to the bottom and from the bottom to the top. A further feature of the invention resides in the fact that the pipes of each inter-connected pair of gas-conveying pipes are inter-connected below the lower annular water chamber or header by a substantially U-shaped pipe union which is removable and is formed as a dust collecting chamber, this union having at its lower side a pipe section which projects downwards into the ashpit of the gas producer.

Thus when there is a change in direction of the gas as a result of its passage through a U-shaped pipe connection of this nature, dust which separates out passes into the ashpit of the gas producer, the pipe projecting into this pit simultaneously serving as a seal in the water-filled ashpit.

Yet another feature of the invention resides in the fact that the gas conducting pipes are provided at their gas inlet ends with thimble-like elements, preferably of hard steel, thereby to reduce considerably the wear which takes place at the mouth of these pipes by the action of the dust in the gas.

A preferred embodiment of the invention is illustrated in the accompanying drawings, in which:

Figures 2 and 3 are on a larger scale than Figure 1.

Figure 1:
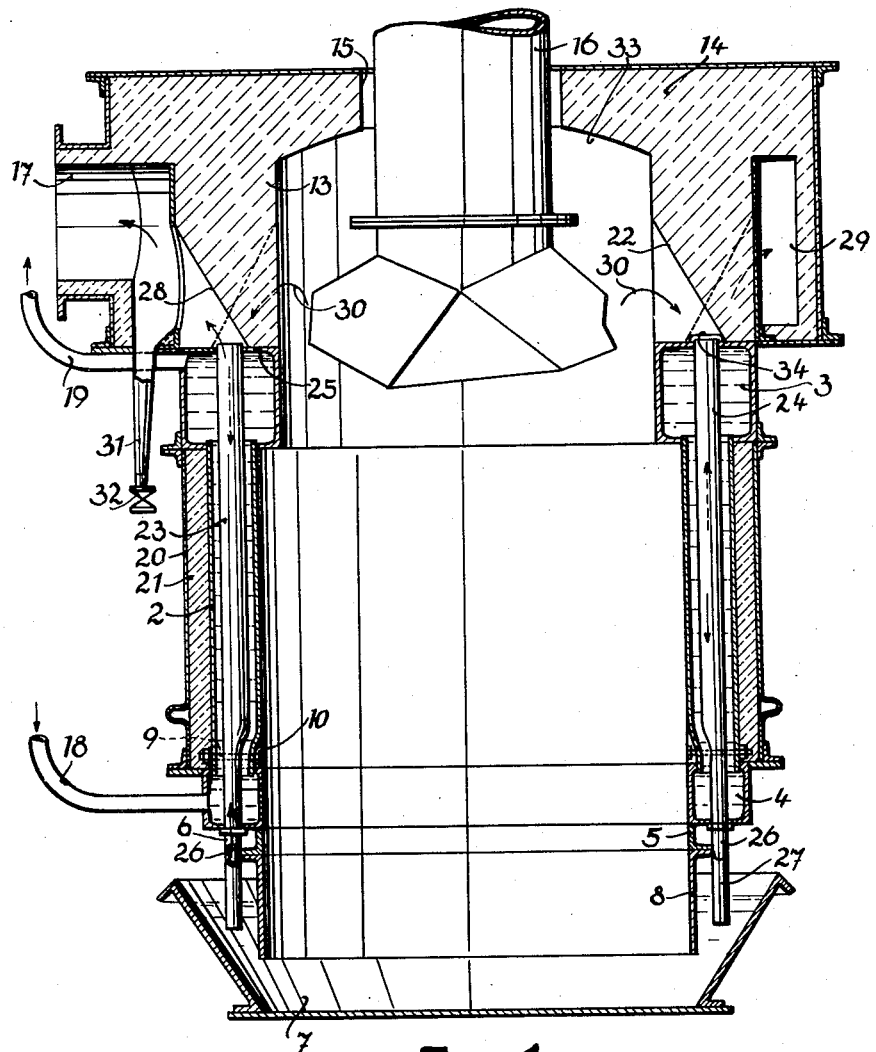
Figure 1 is a vertical section through a gas producer arranged and equipped in accordance with the invention.
Figure 2:
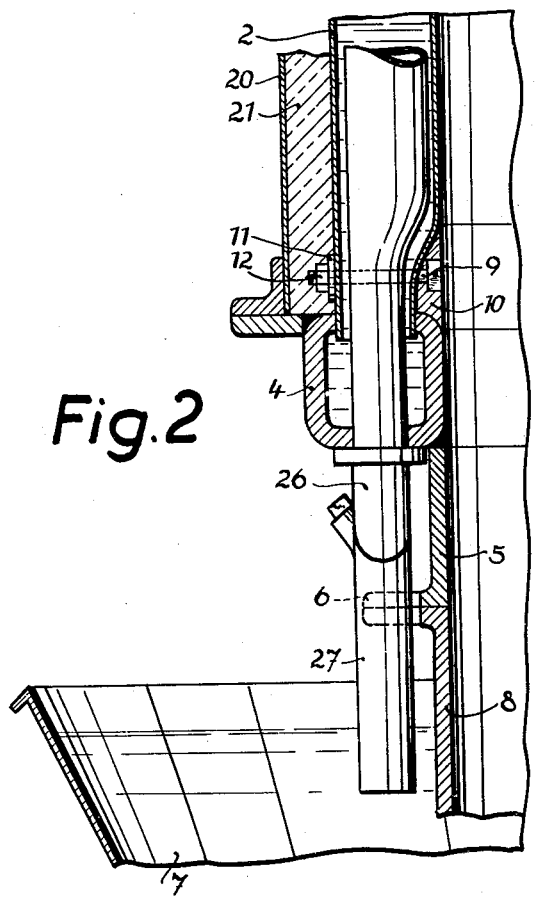
Figure 2 is a vertical cross-section illustrating the junction between two gas conducting pipes and a dust collector leading to the ashpit of the gas producer.

As shown in the drawings, the shaft of the gas producer is defined by vertical pipes 2 which are arranged side-by-side as an annulus, are insulated from the exterior as at 21, and are surrounded by a sheet metal casing 20 serving as a sealing means.

The vertical pipes 2 are connected at their upper ends to an annular water chamber or header 3 and at their lower ends to an annular water chamber or header 4, the pipes 2 being expanded into apertures in the headers 3 and 4. An annular frame 5 of angle iron closely adjoins and runs along the inner wall of the bottom water header 4, being for example connected thereto by welding. A limb 6 of this angle iron ring 5 is connected by screws (not illustrated) with a cup 8 which projects into an ashpit 7.

The vertical pipes 2 are, at their lower ends and at their junction with the header 4 of reduced diameter, being inset at the shaft side. At various points around the periphery of the jacket of the shaft formed in this way, clamping bolts 9 pass through the junctions between adjacent pairs of pipes 2, these bolts being supported at the inner side of the shaft jacket in a filler 10 which occupies the space which is formed by tapering the pipes 2 at these parts and, with the assistance in each case of a nut 12, holding an external clamping ring 11 tight against the jacket of the shaft.

At its upper part the shaft of the gas producer has a housing 13 defining a gas collecting chamber 33, this housing being of refractory material and closed by a cover 14 of the same material. This cover 14 is furnished with an opening 15 through which passes a rotatable charging device 16. The useful gas evolved in the gas producer is drawn off through a pipe connection 17.

Cooling water is supplied to the vertical pipes 2, through the lower water header 4 and a pipe 18 connected thereto, from a steam trap not illustrated in the drawing. The heated cooling water passes out through a pipe 19 connected to the upper water header 3 back to the steam trap, in which the steam escapes from the water and is conducted away to the point of utilisation.

The cooling pipes 2 ar surrounded by the outer sheet metal casing 20, and between this and the pipes 2 is inserted the insulation material 21 of poor heat conductivity.

Figure 3:
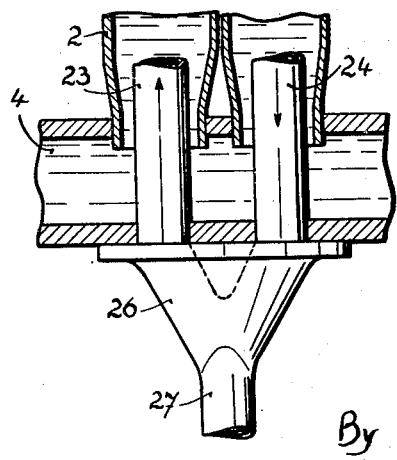
Figure 3 is a side view of the details illustrated in Figure 2. Both

Passing through the vertical pipes 2 are pipes 23, 24, the upper ends of which are rolled into the cover 25 of the water header 3. Each pipe 23 is connected to a pipe 24 which passes through an adjacent vertical pipe 2 by means of a substantially U-shaped pipe union 26, as is seen from Figure 3. The pipe union 26 is of downwardly tapered form and has at its lower part a dependin vertical pipe section 27 which projects into the water-filled ashpit 7 and in this way forms a bell sealing prohibiting the gas flowing through the pipes 23, 24 from escaping into the atmosphere.

The upper shaft casing 13 made of refractory material is provided externally at 28 with bevelled recesses of such a nature as to provide communication between the pipes 23 and an annular chamber 29 surrounding the upper shaft casing 13. A gas take-off pipe 17 is connected to the annular chamber 29.

In the vicinity of each pipe 24 the upper shaft casing 13 is recessed at 22 as to provide communication between the pipes 24 and the inner chamber of the shaft. Thus the hot gas produced in the gas producer passes through the pipes 24, as indicated by arrows 30, out of the gas collecting chamber 33 in the shaft and is conducted at the lower part of the producer into the pipes 23 through the unions 26. The gas then flows from these pipes 23 via the annular chamber 29 to the pipe connection 17 and to the gas main (not illustrated in the drawings) connected to the latter.

Dust bags 31 are fastened at various places around the periphery of the annular chamber 29 and are provided at their lower parts with a closure 32.

The pipes 24 are provided at their mouths with thimble-like elements 34, preferably of hard steel, thereby to prevent wear at the mouth of the pipee by the dust contained in the gas flowing therethrough.

What I claim is:

1. A gas producer comprising a shaft for the fuel to be gasified, the inner face of at least the fuel gasification zone of the shaft being constituted of an annulus series of generally vertical water tubes with the water tubes unprotected from surface contact with fuel and gas in the gasification zone, said water tubes being connected each at their upper and lower ends with annular water headers provided with means for supply and withdrawal of a cooling liquid for the tubes, an annular series of generally vertical gas off-flow pipes with the pipes respectively disposed one inside each of the water tubes axially therealong and spaced from the water tube by an annular water space, said gas off-flow pipes of the annular series thereof being connected with the top of the interior of the gasifying shaft at a level above the upper water header to receive hot gas therefrom and being connected with a final gas outlet for exhaust of cooled hot gas from the gas off-flow pipes.

2. A gas producer as claimed in claim 1, and in which alternate pipes of the annular series of gas off-flow pipes are connected at their upper ends with the top of the interior of the gasifying shaft as aforesaid, and the intermediate pipes of the annular series of gas off-flow pipes are connected at their upper ends with the final gas outlet through an annular chamber at a level above the upper water header, and the alternate gas off-flow pipes are interconnected in pairs with the intermediate pipes at their lower ends for flow of hot gas from the alternate to the intermediate gas off-flow pipes of the pairs.

3. A gas producer as claimed in claim 2, and in which the gas producer is one having a rotary wet seal ash trough below the lower water header, and the pipes of each interconnected pair of alternate and intermediate gas off-flow pipes are interconnected as aforesaid through a removable curved union dust collecting chamber, said union dust collecting chamber having a lower pipe section which projects downwards into said ash trough to discharge the collected dust thereto.

References Cited in the file of this patent

UNITED STATES PATENTS

| | | |
|---|---|---|
| Re. 10,436 | Stewart | Jan. 8, 1884 |
| 935,429 | Stringhem | Sept. 28, 1909 |
| 997,962 | Cambridge | July 18, 1911 |
| 1,015,549 | Foersterling | Jan. 23, 1912 |
| 2,179,638 | Koppers | Nov. 14, 1939 |
| 2,372,991 | Wallis et al. | Apr. 3, 1945 |
| 2,593,032 | Johnson | Apr. 15, 1952 |
| 2,613,145 | Crawford | Oct. 7, 1952 |
| 2,653,555 | Hatton et al. | Sept. 29, 1953 |